US008248205B2

(12) United States Patent
Schindler et al.

(10) Patent No.: US 8,248,205 B2
(45) Date of Patent: Aug. 21, 2012

(54) EXTERNAL DOOR HANDLE, IN PARTICULAR FOR VEHICLES

(75) Inventors: Mirko Schindler, Velbert (DE); Helmut Schumacher, Coesfeld (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 1254 days.

(21) Appl. No.: 10/575,611

(22) PCT Filed: May 21, 2004

(86) PCT No.: PCT/EP2004/005473

§ 371 (c)(1), (2), (4) Date: Jan. 16, 2007

(87) PCT Pub. No.: WO2005/047629

PCT Pub. Date: May 26, 2005

(65) Prior Publication Data

US 2007/0182166 A1 Aug. 9, 2007

(30) Foreign Application Priority Data

Oct. 16, 2003 (DE) ................................. 103 48 719

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G06K 19/00*** | (2006.01) |
| ***G08B 29/00*** | (2006.01) |
| ***G08C 19/00*** | (2006.01) |
| ***H04B 1/00*** | (2006.01) |
| ***H04B 1/38*** | (2006.01) |
| ***H04B 3/00*** | (2006.01) |
| ***H04B 1/02*** | (2006.01) |
| ***H04Q 1/00*** | (2006.01) |
| ***E05B 3/00*** | (2006.01) |

(52) U.S. Cl. .................... 340/5.62; 340/5.64; 292/336.3

(58) Field of Classification Search ............... 340/572.1; 292/336.3

See application file for complete search history.

(56) References Cited

U.S. PATENT DOCUMENTS 4,754,255 A * 6/1988 Sanders et al. ............... 307/10.4

(Continued)

FOREIGN PATENT DOCUMENTS

DE 196 17 038 11/1997

(Continued)

*Primary Examiner* — Benjamin C Lee
*Assistant Examiner* — Cal Eustaquio
(74) *Attorney, Agent, or Firm* — Lucas & Mercanti, LLP; Klaus P. Stoffel

(57) ABSTRACT

The invention relates to an external door handle consisting of a support (10), which is fixed to a door (11) and on which a handle (20) is mounted. In an unlocked position the handle acts on a lock and is inactive in the locked position of said lock. A capacitive sensor is provided to trigger the control of the lock, said sensor comprising an external electrode that is equipped with a sensor surface (37) and is located in the outer region of the door handle. To provide a wide range of configuration options for the location of the sensor surfaces, at least two additional internal electrodes are provided in the inner region of the external door handle, in addition to the sensor surface (37), said electrodes having active surfaces in the form of a transmission surface (36) and an excitation surface (35). An electric switching matrix (50.1), which is connected in series to the field of the sensor surface (37) that is active in the outer region of the external door handle, is generated between the two internal electrodes.

18 Claims, 4 Drawing Sheets

U.S. PATENT DOCUMENTS

| | | | | |
|---|---|---|---|---|
| 6,075,294 | A * | 6/2000 | Van den Boom et al. | 307/10.1 |
| 6,529,122 | B1 * | 3/2003 | Magnussen et al. | 340/407.2 |
| 2001/0052839 | A1 * | 12/2001 | Nahata et al. | 340/5.72 |
| 2003/0222758 | A1 * | 12/2003 | Willats et al. | 340/5.72 |

FOREIGN PATENT DOCUMENTS

| | | |
|---|---|---|
| DE | 296 23 461 | 9/1998 |
| DE | 102 12 768 | 6/2003 |
| EP | 0 955 431 | 11/1999 |
| EP | 0 999 324 | 5/2000 |
| EP | 1 111 171 | 6/2001 |
| FR | 2 828 225 | 2/2003 |
| FR | 2 833 986 | 6/2003 |

* cited by examiner

EXTERNAL DOOR HANDLE, IN PARTICULAR FOR VEHICLES

The invention pertains to an external door handle of the type indicated in the introductory clause of claim 1. The term "external door handle" is to be understood in the following as the entire structural unit which is attached externally to the door and in the door. This structural unit comprises a bracket, which is mounted permanently in the door; a grip, which is supported pivotably on this bracket on the outside surface of the door; and cover parts, located next to the grip, into which a lock cylinder and other functional parts can be integrated as needed. The lock cylinder, the functional parts, and the cover part are also fastened to the bracket.

To increase operating convenience, it is known (DE 196 17 938 C2) that a capacitative sensor can be provided in a locking device of a motor vehicle. This sensor is integrated into the grip of the external door handle. If the request for authorization is satisfied, this capacitative sensor serves to actuate the locking device and thus grants access to the vehicle. In this known device, the authorized person carries an identification transmitter (ID transmitter). When this person's hand approaches the grip, the capacitance of the capacitative sensor changes, and a signal is conveyed to the electronic control unit in the vehicle. This system then uses a send-and-receive device to initiate a search procedure for the ID transmitter, and data communications begin between the ID transmitter and the electronic control unit. The ID transmitter transmits an identification code, and if the person sending it is authorized, the electronic control unit will arrive at a positive code comparison, and the locking device will grant access to the vehicle. The capacitative sensor present inside the movable grip must be connected to the electronic control unit in the vehicle by electrical lines and an plug connection so that the signal can be transmitted. The electrical plug connection has a connector part, which is assigned to the grip, and an opposing connector part, which is assigned to the bracket. The disadvantage here, however, is that the electrical connection of the capacitative sensor to the control unit always requires a stationary connector part. This restricts the design freedom with respect to the arrangement of the capacitative sensor, and in particular a great deal of work is required to install and to connect the sensor. A large number of components is also required.

In a different external door handle (DE 101 53 142 C1), a capacitative sensor with two external electrodes acting in the outside area is integrated into a detachable housing unit, which, if needed, can be mounted on the outside surface of the bracket. Each of the external electrodes has its own sensor surface, one of which is used to trigger the unlocking, the other to trigger the locking of the lock. So that the sensor surfaces will be located at the desired points in the external door handle, the housing unit must have an appropriately subdivided, angled housing. This restricts the design freedom with respect to the installation of the sensor surfaces, because these points must always be readily accessible.

The invention is based on the task of developing an inexpensive external door handle of the type indicated in the introductory clause of claim 1 with reliably effective sensor surfaces. This is achieved according to the invention by the measures cited in claim 1, to which the following special meaning attaches.

At least two additional inner electrodes of the capacitative sensor, which serve to transfer an inner electronic coupling field, are installed in the interior of the external door handle. The active surface of the first electrode serving to build up this coupling field is called the "exciter surface". The active surface of the other electrode is connected to the outward-acting sensor surface and is therefore called the "transfer surface" for the coupling field. In the invention, capacitative contact is established across the two inner electrodes. In electrical terms, the electrical coupling field between the transfer surface and the exciter surface is connected in series with the sensor surface. As a result of the electrical coupling field, gaps between the components of the external door handle attributable to production tolerances can be easily bridged, and thus the sensor surfaces can be located even in difficult-to-contact areas of the external door handle. A greater amount of freedom with respect to the planning of the dimensions and the arrangement of the various sensor surfaces is thus obtained.

The sensor surface and the transfer surface of the one inner electrode can be easily connected to each other by producing the outer electrode carrying the sensor surface and the inner electrode carrying the transfer surface as a single part. A one-piece component of this type can be very easily integrated into the corresponding component of the external door handle. This can be done by stacking, injection-molding, or by the deposition of electrically conductive layers or tracks.

Additional measures and advantages of the invention can be derived from the subclaims, from the following description, and from the drawings. The drawings illustrate several exemplary embodiments of the invention in schematic fashion:

Figure 1:
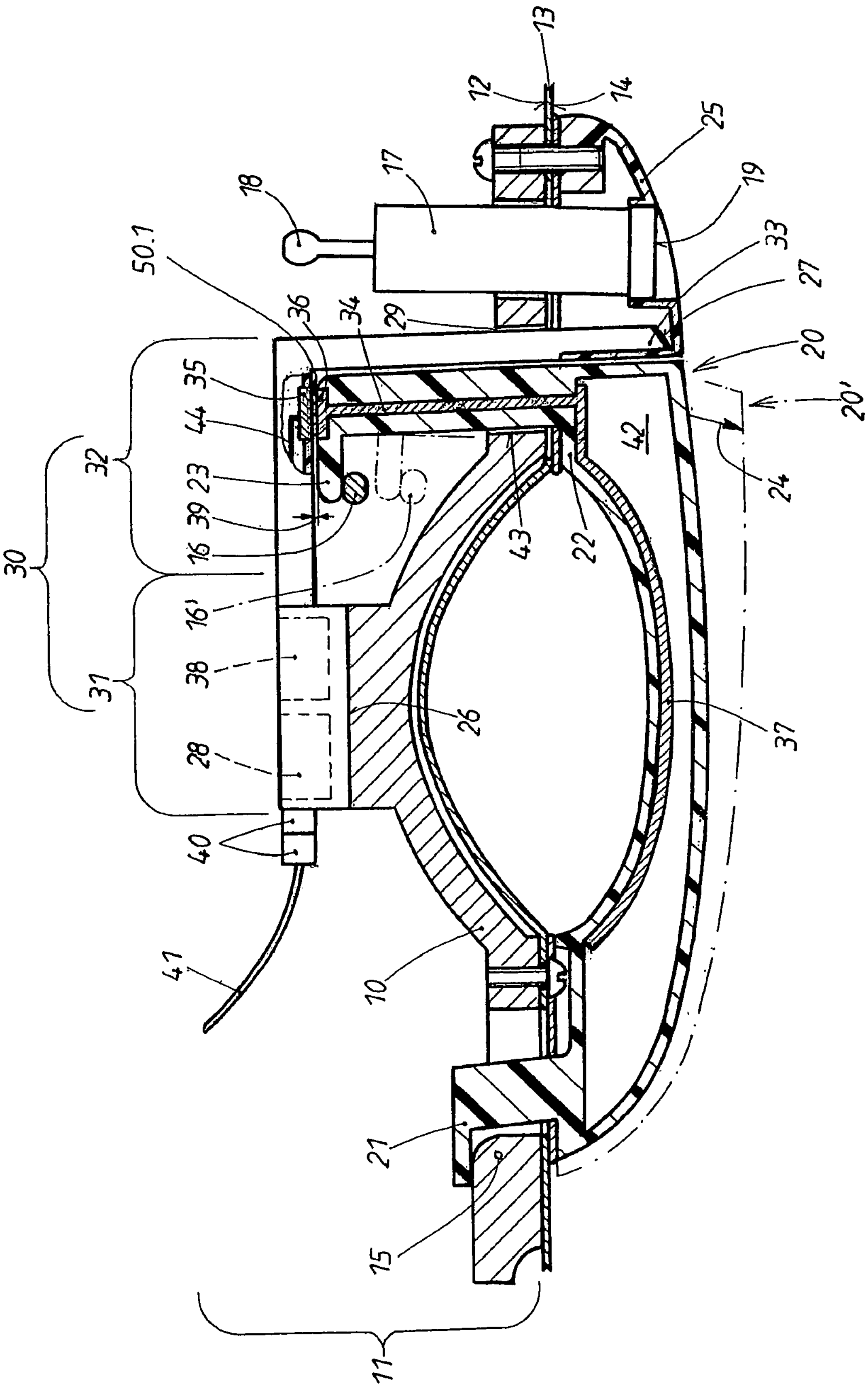
FIG. 1 shows a longitudinal cross section through a first exemplary embodiment of an external door handle mounted on a door.

In the interior 11 of the door, a bracket 10 is attached to the inward-facing 12 of the external skin 13 of the door. On the exterior surface 14 of the external door skin 13 is a grip 20, which is designed here as a pull-type grip. One end 21 of the grip is supported pivotably on the bracket 10 at 15, whereas the other end 22 carries an arm 23. The arm 23 is in the form of a hook, which cooperates with a working element 16, which belongs to a lock (not shown) in the door.

The lock can be switched between a locking position, in which actuation of the grip 20 to open the door is nonfunctional, and an unlocked position, in which actuation of the grip 20 in the direction of the arrow 24 is functional in terms of the lock and thus opens the lock. The actuating position of the grip is illustrated in broken line in the drawing and designated by the symbol 20'. The working element thus arrives in its working position, shown in broken line and designated by the symbol 16'.

Next to the grip 20 is a cover part 25, which is seated on the exterior side of the external door skin 13 and which conforms to the external profile of the grip 20. This cover part is advisably fastened to the bracket 10. In the present case, a locking cylinder barrel 17 is also fastened to the bracket 10, the output end 18 of which cooperates with the lock. A key (not shown) is able to access the exterior end surface 19 of the locking cylinder barrel 17 in the area of the cover part 25. This locking cylinder barrel 17 is usually used only in an emergency, i.e., when the electronic control system in the vehicle has failed. In many applications, the locking cylinder 17 can be omitted entirely and replaced by a dummy barrel.

A separate housing unit 30 is attached to the inward-facing 26 of the bracket 10; this unit is divided into a main housing 31 and a projecting housing "finger" 32. A first sensor surface 27 of a capacitative proximity or contact sensor is located on the free end 33 of the finger. This sensor acts in the outside area of the external door handle, and its electronic components, such as those indicated in broken line at 28, are integrated into the interior of the main housing 31. This sensor surface 27 serves to trigger the locking of the lock. Instead of the sensor surface 27, it would also be possible to use a contact switch or a pushbutton switch. When a person carrying proper access authorization brings his hand close to the sensor surface the process by which the lock is locked is initiated. It is therefore favorable for the end 33 of the finger to be as close as possible to the cover part 25. For this purpose, both the bracket 10 and the exterior door skin 13 are provided with an opening 29 in this area. The arm 23 of the pull-type grip 20 also passes through this opening 29.

The grip 20 is preferably provided with a cavity 42, in the interior of which an electrode acting in the outside area of the external door handle is installed and therefore remains protected. The active sensor surface of this electrode is designated 37. This sensor surface 37 also belongs to the capacitative sensor, but it serves to trigger the unlocking of the lock. At in the inner end of the arm 23 and in the area of the housing finger 32, two inner electrodes are provided, the active surfaces of which are designated 35, 36. When the grip 20 is in the resting position, as shown in the drawing, a small gap 39 remains between the two active surfaces 35, 36. The housing-side active surface 35 is connected to the electrical components 37 of the grip-side sensor electrode 37 by the electrical wiring 44, only partially illustrated, passing through the housing 30 and cooperates with the other electrode located in the arm 23 to build up the previously mentioned electrical coupling field 50.1 in the gap 39. This coupling field 50.1 is indicated by dots in FIG. 1. For this reason, the active surface 35 of the first inner electrode, i.e., the electrode on the housing side, is called the "exciter surface", and the active surface of the other inner electrode in the arm 23 is called the "transfer surface". This transfer surface 36 is connected for its own part by a fixed electrical conductor 34 to the sensor surface 37 integrated into the grip 20. The electrode with the sensor surface 37, the electrode with the transfer surface 36, and the electrical line 34 between them can be designed to form a single piece and integrated into the grip when the grip is produced by a technique such as injection-molding or the like. The same voltages and voltage profiles which are built up at the exciter surface 35 cross the field bridge present in the gap 39 and propagate to the sensor surface 37. Conversely, changes in the electrical field in the area of the sensor surface 37 are conducted via the two free contactless active surfaces 36, 35 to the associated electronic sensor circuit 38 in the bracket 10. The electrical coupling field 50.1, in electrical terms, is connected in series with the external field acting in the area outside the sensor surface 37.

The signals received by the electronic sensor circuit 38 are sent via an electrical plug connection 40 and a cable 41 to an electronic control unit in the vehicle. The control unit then transmits a control pulse, which unlocks the lock in this particular door. If a central locking function is present in the vehicle, all the other doors and hatches of the vehicle are unlocked also.

It is obvious that the exciter and transfer surfaces 35, 36 can be positioned elsewhere on the grip 20 and on the bracket 10. The housing unit 30 could also be located in some other area of the bracket, e.g., in the area of the previously mentioned locking cylinder 17 or dummy barrel provided there. Instead of the two inner electrodes, contacts could also be provided, which are in contact with each other in the resting state and are thus able to transmit the various voltages and signals. The use of the previously described contactless inner electrodes, however, offers the advantage that production tolerances with respect to the gap between the exciter surface 35 serving to build up the coupling field 50.1 and the transfer surface 36 can be easily accommodated. The door lock can also be unlocked by way of the sensor surface 37 even while the grip 20 is in the resting position.

Figure 2:
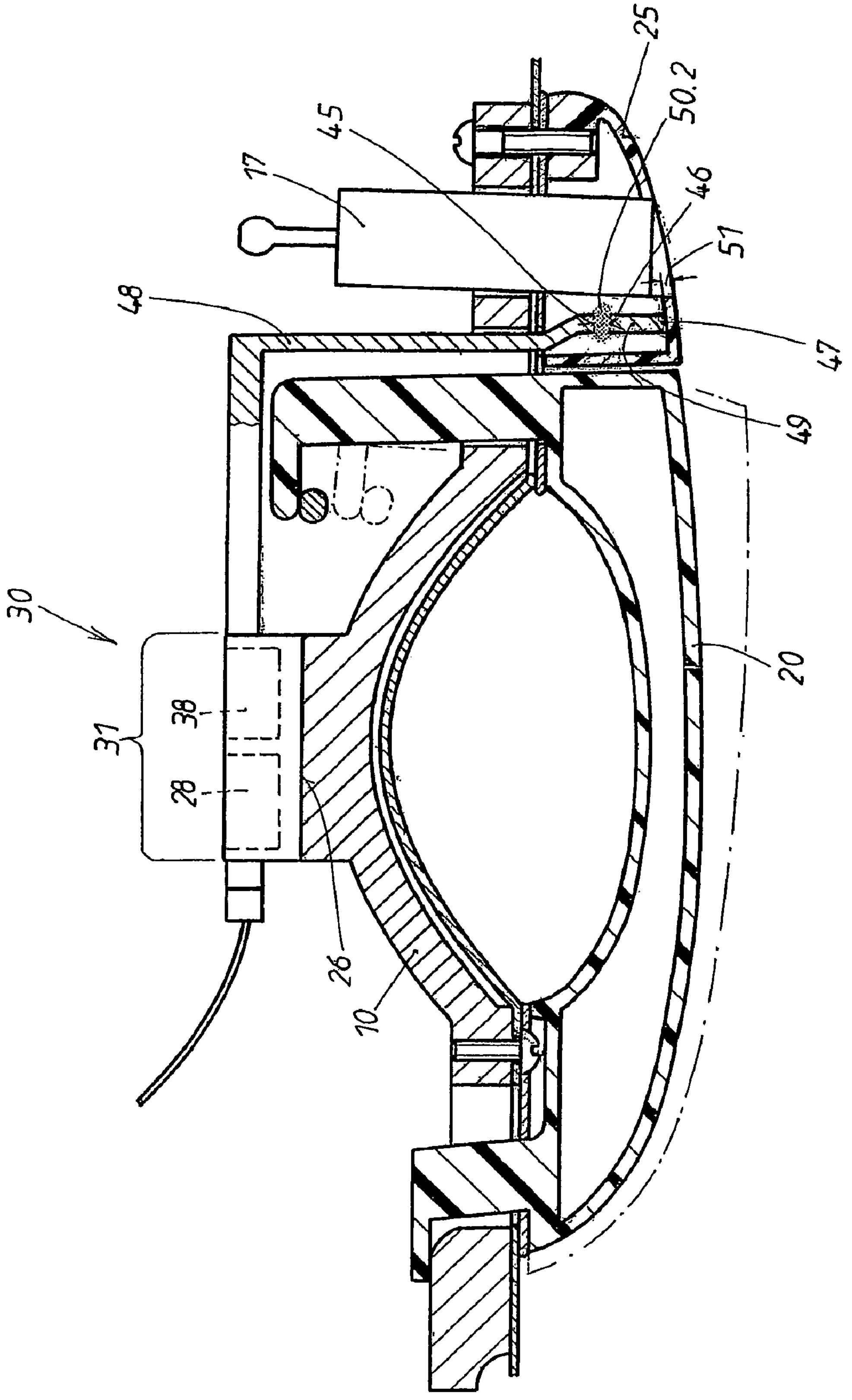
FIG. 2 shows a second exemplary embodiment of an external door handle of a design similar to that shown in FIG. 1.
Figure 3:
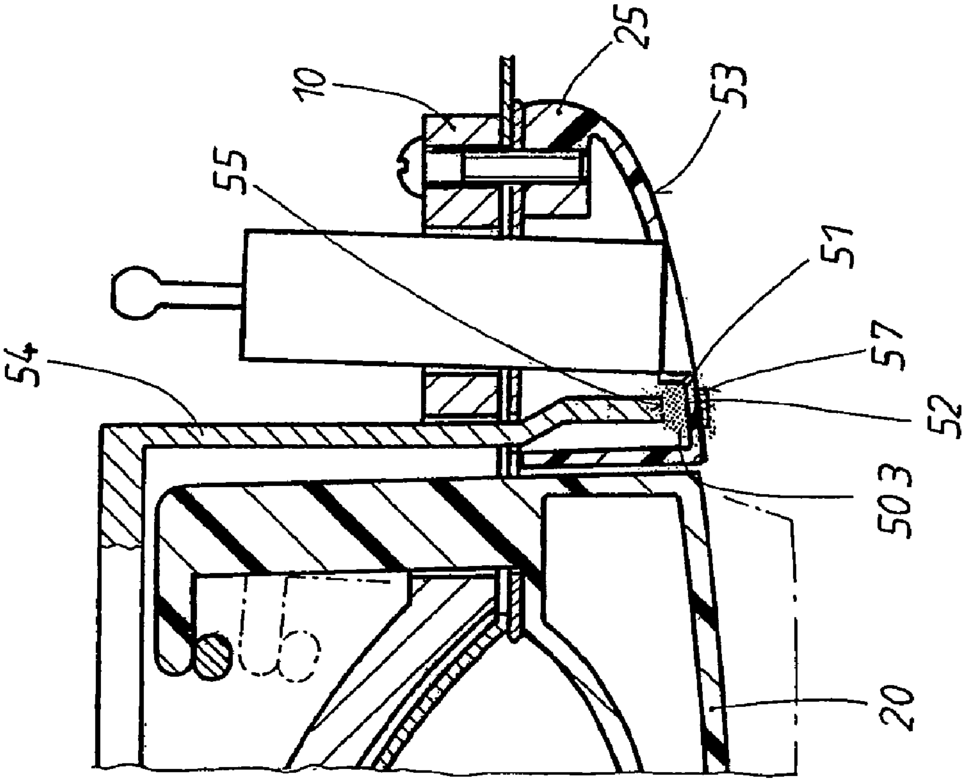
FIG. 3 shows part of a third exemplary embodiment, representing a variant of FIG. 2.
Figure 4:
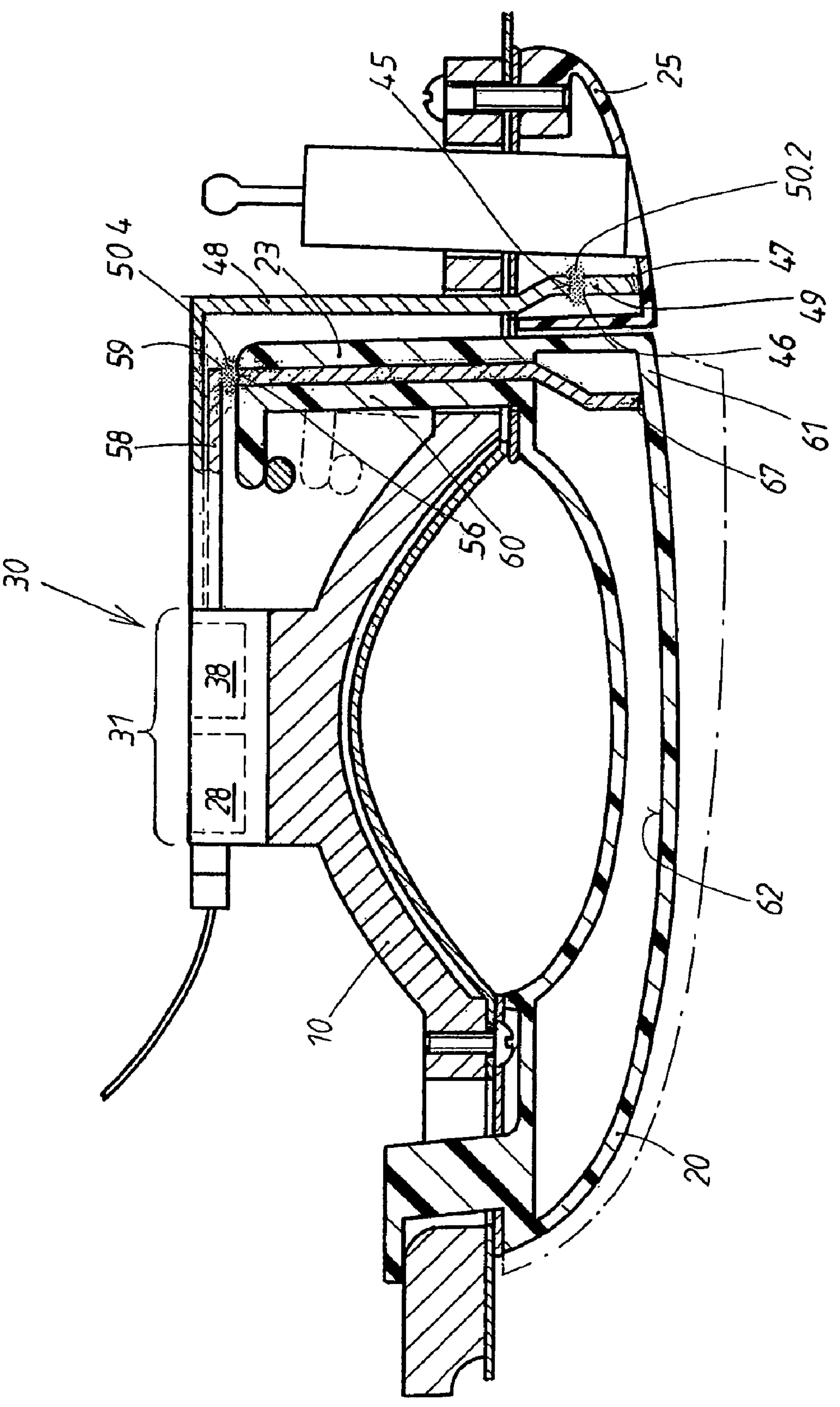
FIG. 4 shows a fourth exemplary embodiment, which in principle uses the designs of FIGS. 1 and 2 simultaneously.

As previously mentioned, FIGS. 2, 3, and 4 show three other variants of the inventive external door handle. Similar parts are designated by the same reference numbers as those used in FIG. 1. To this extent, the previous description also applies here. It is sufficient, therefore, to discuss only the differences.

In FIG. 2, an external electrode with its sensor surface 47 acting in the outside area of the external door handle is located in the cover part 25, which holds the previously mentioned locking cylinder 17 or a dummy cylinder. Two inner electrodes in the external door handle are assigned here, too, to this sensor surface 47. The exciter surface 45 of the one electrode and the transfer surface 46 of the other electrode generate between them an electrical coupling field 50.2, which is emphasized in FIG. 2 by the dotted shading. The sensor surface 47 and the transfer surface 46 are permanently connected to each other by an electrical conductor 49. These components can also be produced as a single part, where the sensor surface 47 and the transfer surface 46 are formed by the end surfaces of the conductor.

The other inner electrode, i.e., the one with the exciter surface 45, is provided with an electrically conductive extension 48, which leads to the housing 31 of the previously described structural unit 30 and is connected there to the associated electronic sensor circuit 38. In this case as well, the structural unit 30, which contains the electronic sensor circuits 28, 38, is attached to the inward-facing 26 of the bracket 10. This is done from the inside of the door.

In FIG. 2, the sensor surface 47 is located at the inside surface of the cover part 25. In front of the sensor surface 47 is the wall 51 of the cover part 25, which can be provided here with its full thickness. FIG. 3 shows an alternative to this.

In FIG. 3, the wall 51 of the cover part 25 can be made thinner. The key difference from FIG. 2, however, is that, on the outside surface 53, the cover part 25 carries a layer 52 of electrically conductive paint, at least in a defined area, the outside surface of which again creates the sensor surface 57, which acts in the outside area of the external door handle. In FIG. 3, the second inner electrode with is exciter surface 55, as described previously in conjunction with FIG. 2, is present in the small free gap behind the inside surface of the wall 51. This electrode again has an extension 54. The extension 54 again leads to the housing of the structural unit (not shown).

In FIG. 4, as previously mentioned, a modification of the measures of FIG. 1 are used simultaneously with the measures of FIG. 2. To that extent, the description given so far also applies here. Here, two different sensor surfaces 47, 67, which trigger different functions in the vehicle when an authorized person approaches or touches them, act in the outside area of the external door handle. As already explained in conjunction with FIG. 2, the sensor surface 47 serves to lock the lock integrated into the door. The other sensor surface 67, however, as in FIG. 1, serves to unlock the lock. This embodiment differs from that of FIG. 1, however, in the following ways.

The extension 48 of the electrode belonging to the exciter surface 45 of the coupling field 50.2 is isolated from the other electrode 58. The two extensions 48, 58 lead to the housing 31 of the structural unit 30. At the outer end of the electrode 58, there is again an exciter surface 59, which creates another electrical coupling field 50.4 in the external door handle of FIG. 4. In this case, too, the transfer surface 56 of an opposite inner electrode, which is formed by the terminal part of a one-piece electrical conductor 60, also belongs to the electrical coupling field 50.4.

The conductor 60 is integrated into the previously described arm 23 of the grip 20, which is also designed here as a pull-type grip. At the outer end of the conductor 60 there is the previously described second sensor surface 67. The sensor surface 67 can extend up as far as the inside surface 62 of the preferably hollow grip 20 and is protected from the outside by a wall 61 of the grip 20.

Additional sensor surfaces can be provided in the area of the grip 20, of the cover part 25, or at other points and thus separated from each other both spatially and functionally. To facilitate assembly in this case as well, inner electrodes should be assigned to at least one or more of these sensor surfaces. By way of exciter surfaces and transfer surfaces, the inner electrodes will be able to generate the electrical coupling field. Upon the approach of an authorized person or upon contact by that person, different functions in the vehicle will thus be initiated.

In addition to the previously described unlocking and locking of the lock, it would also be possible to actuate other movable parts in the vehicle in the opening direction and/or closing direction when the associated sensor surface responds. For the opening and closing of such movable parts, it is also possible to provide only a single sensor surface, which, when approached or contacted, initiates movement in one direction and, when approached or contacted again, initiates movement in the other direction. Moving parts of the vehicle can be one or more of the windows, a sliding roof, a rear hatch, or even one or more doors of the vehicle.

The electrodes which are used to build up the coupling field can also be located anywhere in the external door handle. For example, it is possible, in analogy to FIG. 4, to lengthen the electrode 58 and to let it continue next to the electrode extension 48 all the way to the interior of the cover part 25. The previously described exciter surface 59 for a coupling field similar to 50.4 of FIG. 4 will then be located behind the cover part 25. The other inner electrode belonging to the sensor surface 67 with its transfer surface characterized in FIG. 4 by the number 56 will in this case be located at the inside surface of the grip 20 adjacent to the cover 25. In this described alternative case, the electrical conductor 60 of FIG. 4 no longer runs in the longitudinal direction of the arm 23 but rather more-or-less transversely to it.

If some other additional functions are to be initiated in the vehicle, an additional sensor surface, a certain distance away from the sensor surface 47 in the cover part 25 described in conjunction with FIGS. 2 and 4, can also be provided in the cover part 25. Inner electrodes will then again be assigned to this third sensor surface. As shown in FIG. 2, these inner electrodes will advisably have their electrode extension 48 outside the grip.

The electrically conductive layer 52 according to FIG. 3 can also be made of elastic material such as plastic, which has been made electrically conductive. Instead of being provided on exterior surfaces, as in FIG. 3, such electrically conductive layers can be provided on interior surfaces of the external door handle, e.g., in the interior of the grip 20 or of the cover 25, or of other elements located in this area. These layers can then serve not only the function of sensor surfaces but also the function of transfer surfaces and exciter surfaces for creating the coupling fields in question.

LIST OF REFERENCE NUMBERS

10 bracket
11 interior of the door
12 inward-facing of 13
13 external skin of the door, door panel
14 exterior surface of 13
15 bearing point on 10 for 20
16 working element for the door lock (rest position)
16' working position of 16
17 locking cylinder
18 output end of 17
19 end surface of 17
20 grip, pull-type grip (resting position)
20' actuating position of 20
21 first end of 20, bearing end
22 second end of 20, working end
23 arm of 20 for 16
24 arrow of the actuation of 20
25 cover part
26 inward-facing of 10
27 first sensor surface, active surface for unlocking the lock
28 electronic components, electronic sensor circuit for 27
29 opening in 10 and 13
30 structural unit for 27, 37
31 housing, main housing of 30
32 housing finger of 30
33 end of finger 32
34 electrical line between 36 and 37
35 active surface of the first inner electrode, exciter surface for 50.1
36 active surface of the second inner electrode, transfer surface for 50.1
37 second sensor surface, active surface for unlocking the lock
38 electrical components for 37, electronic sensor circuit
39 gap between 35 and 36
40 electrical plug and opposing plug
41 cable at 40
42 cavity in 20 for 37
43 guide surface in 10 for 23
44 electrical lines in 30 between 35 and 38
45 exciter surface for 50.2 (FIG. 2)
46 transfer surface for 50.2 (FIG. 2)
47 sensor surface (FIGS. 2, 4)
48 extension of the electrode of 45 (FIGS. 2, 4)
49 conductor between 46 and 47 (FIGS. 2, 4)
50.1 coupling field (FIG. 1)
50.2 coupling field (FIG. 2)
50.3 coupling field (FIG. 3)
50.4 coupling field (FIG. 4)
51 wall of 25 (FIG. 2)
52 layer of electrically conductive paint (FIG. 3)
53 outside surface of 25 (FIG. 3)
54 extension of the electrode of 55 (FIG. 3)
55 exciter surface for 50.3 (FIG. 3)
56 transfer surface for 50.4 (FIG. 4)
57 sensor surface of 52 (FIG. 3)
58 electrode for 56 (FIG. 4)
59 exciter surface of 58 (FIG. 4)
60 electrical conductor for 56, 67 (FIG. 4)
61 wall of 20 (FIG. 4)
62 inside surface of 20 (FIG. 4)
67 sensor surface in 20 (FIG. 4)

The invention claimed is:

1. External door handle, for a door of a motor vehicle, comprising:

a stationary bracket (10) attached to an interior (11) of the door;

a grip (20) arranged on an exterior of the door, the grip being movable so as to act on a lock and serves to open and/or close the door when actuated;

wherein the lock can be switched between a locked and an unlocked position, wherein an actuation (24) of the grip (20) is nonfunctional in the locked position and functional in the unlocked position; and at least one capacitive sensor on the door handle, which on an outer region of the door has active outer electrode (37; 47; 52; 67) and serves for locking and unlocking the lock;

wherein the outer electrode (37; 67) is arranged in the movable grip (20) and/or on a cover part (25) of the door handle arranged adjacent (22) to the grip (20) and senses the approach of or contact by an authorized person; and wherein the authorized person carries with him means of identification for activating the capacitive sensor;

an electronic sensor circuit (28, 38) arranged on the stationary bracket (10) and active after identification of the authorized person;

at least one first, fixed inner electrode (35; 45; 55; 59) in the interior (11) of the door and connected with the electronic sensor circuit (28, 38) in the bracket (10) by an electrical line (44; 48; 54);

a second inner electrode (36; 46; 56) arranged in the interior (11) of the door cooperatively spaced to form a gap (39) with the first inner electrode (35; 45; 55; 59), the first inner electrode proximate to or on the second inner electrode coupled to the grip (20) and the second inner electrode movable with the grip (20) or the second inner electrode resting on the adjacent cover part (25), the adjacent cover part proximate to the first inner electrode;

wherein the second inner electrode (36; 46; 56) is connected to the outer electrode (37; 47; 52; 67) by an electrical line (34; 49; 60);

wherein the gap (39) simultaneously forms a separation between the electronic sensor circuit (28, 38) on the bracket (10) and the movable grip (20) or the adjacent cover part (25); and wherein, at least in a rest position of the grip (20), an inner electrical coupling field (50.1; 50.2; 50.3; 50.4) is generated in the gap (39) between both inner electrodes (35; 45; 55) (36; 46; 56), which activates the outer electrode (37; 47; 52; 67) on an outer region of the door as a capacitive sensor.

2. External door handle according to claim 1, wherein the grip (20) is constructed as a pull-type grip that is pivotably supported (15) at one end (21) on the bracket (10), wherein the transfer surfaces of the second inner electrode (36; 56) are arranged on an opposite free end (22) of the grip.

3. External door handle according to claim 2, wherein the grip end (22) has an arm (32) that cooperates with the lock upon actuation (24) of the pull-grip (20), wherein the movable transfer surfaces of the second inner electrode (36; 56) are at an inner end of the arm (23), and wherein, the transfer surfaces of the second inner electrode (36; 56) and the electrical connection (34, 60) to the sensor surface (37, 67) are integrated in the arm (23).

4. External door handle according to claim 1, wherein a layer (52) of electrically conductive paint is applied to the exterior surfaces (53) and/or to the interior surfaces of the external door handle, at least in certain defined areas, and in this paint layer (52) produces the sensor surfaces (57).

5. External door handle according to claim 1, wherein an electrically conductive layer of elastic material is applied to the exterior surfaces and/or to the interior surfaces of the external door handle, at least in certain defined areas, and this layer produces the sensor surfaces (57).

6. External door handle according to claim 1, wherein the external door handle has several separate, outer electrodes (67; 47) for sensing the presence of a human hand and/or the inner first electrode (56; 46) and second electrode (59; 45) for building up the coupling field, and in that these separate outer electrodes (67; 47), upon contact by or approach of the authorized person, trigger different functions in the lock and/or in the vehicle.

7. External door handle according to claim 6, wherein one of the outer electrodes (67) serves to unlock the lock, whereas another (47) serves to lock the lock.

8. External door handle according to claim 6, wherein, upon the approach of or contact by the authorized person, at least one of the outer electrodes triggers the movement of movable parts in the vehicle in the opening and/or in the closing direction.

9. External door handle according to claim 8, wherein the outer electrodes cause the movable parts to move in the opening direction upon contact by or approach of the authorized person and then in the closing direction upon the next approach or contact.

10. External door handle according to claim 8, wherein the movable parts are one or more windows, a sliding roof, a rear hatch, and/or one or more doors of the vehicle.

11. External door handle according to claim 1, wherein the electronic sensor circuits (28, 38) are located in a housing unit (30), which is seated on the bracket (11).

12. External door handle according to claim 11, wherein the housing unit (30) is prefabricated and can be attached to the inward-facing (26) of the bracket (11).

13. External door handle according to claim 11, wherein the housing unit (30) is prefabricated and is attached in the area of a barrel (17) mounted on the bracket, where the barrel (17) is mounted in the bracket (11) next to the grip (20).

14. External door handle according to claim 11, wherein the housing unit (30) consists of a main housing (31) and a projecting housing finger (32); and the end (33) of the finger (32) extends into the outer area (25) of the external door handle, where it has an outward-acting outer electrode (27) for triggering the locking of the lock.

15. External door handle according to claim 14, wherein the electronic sensor circuit (28, 38) is integrated into the main housing (31) of the housing unit (30), whereas the housing finger (32) can be inserted through an opening (29) in the bracket (11) and through a hole in the outer housing skin (13) of the door.

16. External door handle according to claim 15, wherein the finger (32) follows a profile course of the arm (23) when the grip (20) is in a rest position.

17. External door handle according to claim 14, wherein the first inner electrode (35) is located in the housing unit (30).

18. External door handle according to claim 1, wherein the outer electrodes (37; 67) the second inner electrode (36; 46; 56) that generates the coupling field, and the electrical conductors (34, 49, 60) that connect them to each other are all constructed as a single part.

* * * * *